United States Patent [19]

Bannai et al.

[11] Patent Number: 5,481,412
[45] Date of Patent: * Jan. 2, 1996

[54] VIDEO SIGNAL DIGITAL RECORDING/REPRODUCING APPARATUS

[75] Inventors: Tatsushi Bannai, Sakai; Hideaki Shibata, Osaka; Masamitsu Ohtsu, Moriguchi; Hiroshi Okamoto, Nara, all of Japan

[73] Assignee: Matsushita Electric Industrial Co., Ltd., Osaka, Japan

[ * ] Notice: The portion of the term of this patent subsequent to Jan. 17, 2012, has been disclaimed.

[21] Appl. No.: 234,379

[22] Filed: Apr. 28, 1994

Related U.S. Application Data

[63] Continuation of Ser. No. 736,058, Jul. 26, 1991, Pat. No. 5,383,063.

[30] Foreign Application Priority Data

Jul. 30, 1990 [JP] Japan ................................ 2-202122

[51] Int. Cl.$^6$ .................................................. G11B 5/02
[52] U.S. Cl. ............................................ 360/18; 360/33.1
[58] Field of Search .............................. 360/18, 33.1, 64; 358/343

[56] References Cited

U.S. PATENT DOCUMENTS

| | | | |
|---|---|---|---|
| 4,092,665 | 5/1978 | Saran | 365/230.03 |
| 4,142,209 | 2/1979 | Hedlund et al. | 360/77.06 |
| 4,395,738 | 7/1983 | Hedlund et al. | 360/33.1 |
| 4,897,739 | 1/1990 | Hasegawa et al. | 360/33.1 |
| 4,985,766 | 1/1991 | Morrison et al. | 358/136 |
| 5,070,419 | 12/1991 | Kiyonaga | 360/72.2 |
| 5,383,063 | 1/1995 | Bannai et al. | 360/18 |

FOREIGN PATENT DOCUMENTS

| | | |
|---|---|---|
| 0367264 | 5/1990 | European Pat. Off. . |
| 63-95791 | 4/1988 | Japan . |
| 1-106382 | 4/1989 | Japan . |
| 2-214001 | 8/1990 | Japan . |

*Primary Examiner*—Edward P. Westin
*Assistant Examiner*—Jon Santamauro
*Attorney, Agent, or Firm*—Wenderoth, Lind & Ponack

[57] ABSTRACT

In a video signal recording/reproducing apparatus, a video signal is subjected to bit rate reduction including a variable length processing to obtain a coded data. The coded data is separated into basic data which shows a basic construction of a video image and has a fixed data length and additional data which shows detailed information of the video image and has a variable data length. In recording the coded data containing basic data and additional data on a recording medium, the basic data is recorded in one region on the recording medium and the additional data is recorded continuously in a region other than the basic data recording region, by which both data are recorded in separated regions on the recording medium.

4 Claims, 6 Drawing Sheets

VIDEO SIGNAL DIGITAL RECORDING/REPRODUCING APPARATUS

This application is a continuation of application Ser. No. 07/736,058, filed Jul. 26, 1991, now U.S. Pat. No. 5,383,063.

BACKGROUND OF THE INVENTION

1. Field of the Invention

The present invention relates to a video signal recording/reproducing apparatus for recording video signals by bit rate reduction to allow the stabilized reproduction of video images.

2. Description of the Prior Art

In tune with the trend to adopt digital systems to various audio and video apparatuses and transmission channels, studies have been made on bit rate reduction systems for efficiently reducing data, and in video tape recorders (hereinafter referred to as VCRs) studies have been made with respect to methods of increasing the utilization efficiency of the tape by reducing the amount of data to be recorded, utilizing this technique. In general, bit rate reduction reduces the amount of data by deleting the two-dimension spatial superfluity and inter-frame superfluity by utilizing the correlations of video images. It extracts the characteristic of the video image and provides coding with respect to its characteristic. Furthermore, since the video image has individual characteristics for different parts of the pixel image, and since the amounts of data representing the respective characteristics are respectively different, variable length coding which provides different coding amounts according to the characteristics of the video image in a narrow range can provide a higher compression rate without deteriorating the encoded image quality as compared to fixed length coding for coding a certain amount of data in a certain narrow range of images.

The bit rate reduction allows curtailment of the amount of data in the information source with a high efficiency, but generates various problems in recording and reproducing the data of bit rate reduction on a VCR. For example, in a VCR, the signal to noise ratio (hereinafter referred to as the SNR) in reproducing is inferior to that in transmission and additionally dropout occurs. Therefore, even in carrying out recording and reproducing by adding an error correcting code, there may be cases where the data after the error correction includes bit errors. If the data includes errors, erroneous video signals will be decoded; in which case, in comparison with the case of recording the video signals without compression, when recording and reproducing are performed by bit rate reduction, the image quality is deteriorated over a wide range on a decoded pixel having one bit error. Moreover, when variable length bit rate reduction is performed, errors are propagated to other data, causing the deterioration of the image quality over a wider range on the decoded pixel.

In a VCR, search is essential, and the reproducing head crosses the video track. It is difficult to decode the search image from the reproduce variable length data. Further, s the correction capacity in searching generally decreases drastically in comparison with the case of normal reproducing, bit errors are increased.

A method of converting the video signal using a variable length bit rate reduction, recording it on a VCR and decoding the discriminating search image, is disclosed in Japanese Patent Publication (Unexamined) No. 63-95791/1988. Japanese Patent Publication (Unexamined) No. 63-95791/1988 relates to a coding apparatus in which a two dimension region formed by a video signal is divided into plural blocks, each of which is subjected to variable length coding to obtain coded data of a fixed length and a variable length; the variable length data is distributed so as to make the length of the variable length data equal to the above-mentioned block, and the error correction code is added by a block in which the data length has become equal, so as to carry out recording.

However, in a VCR, it is an effective means to make the tape winding angle small in searching so as to alleviate the burden of the mechanical system during high speed searching, and the construction of the foregoing reference involves a problem in that, as the fixed length data is recorded at equal intervals on the recording track in the recording medium, when the tape winding angle is reduced a recorded portion of the fixed length data does not come into contact with the reproducing head, which causes an extreme deterioration of the search image quality. Furthermore, in the case of reproducing the signal by using plural heads and improving the amount of data to be reproduced per specified time during high speed searching (hereinafter referred to as the data acquisition rate), a new reproducing circuit is required for processing in parallel with the reproducing circuit used during normal reproduction.

SUMMARY OF THE INVENTION

In view of the points as mentioned above, an object of the present invention is to provide a recording and reproducing apparatus in which stabilized reproduced video images are obtainable during the recording and reproducing video signal data which has been subjected to bit rate reduction.

According to the present invention, a video signal recording/reproducing apparatus is provided which comprises: encoding means for subjecting an input video signal to bit rate reduction including variable length processing to obtain coded data; a separating means for extracting and separating, from said coded data, basic data which represents rough basic construction of a whole image and which comprises data of a fixed data length and additional data which represents details of the whole image and which comprises data of a variable data length; and a recording means for recording said basic data and said additional data on a recording medium such that a whole area of the recording medium is divided into a first continuous region in which only the basic data is continuously and collectively recorded and a second continuous region in which only the additional data is continuously and collectively recorded.

The basic data is the data carrying information for forming a rough construction of the whole image, and composed of data of the DC component and data of low frequency components in a low frequency range lower than a relatively low specific frequency.

The additional data is the data carrying information for adding details of the image to the rough construction, and composed of data of high frequency components in the higher frequency range than the low frequency range.

The video signal is coded by the bit rate reduction coding processing such that each unit of basic data has a fixed data length and each unit of additional data has a variable data length.

In the present invention, by the above-mentioned construction, the basic data and the additional data are recorded together in separate regions on a recording medium. Accordingly, there is no propagation of an error in the basic data part given by a fixed data length to other blocks, so that the error propagation characteristic to the basic data can be improved. Furthermore, if a search image is obtained by decoding the basic data during searching, notwithstanding the system using variable length processing as a bit rate reduction technique, a search image can be obtained by the processing of the basic data at which the data length is fixed during searching, thus simplifying the signal processing. Furthermore, by recording the basic data in a region within the specified angle of the rotary angle of the rotary cylinder and subjecting the plural reproducing heads to reproduction by switching at each specified angle during searching, the data acquisition rat during searching can be improved without increasing the number of channels for reproduction processing, so that it becomes easy to recognize the search image even in the case of a quick image movement or a scene change.

DESCRIPTION OF THE PREFERRED EMBODIMENTS

Figure 1:
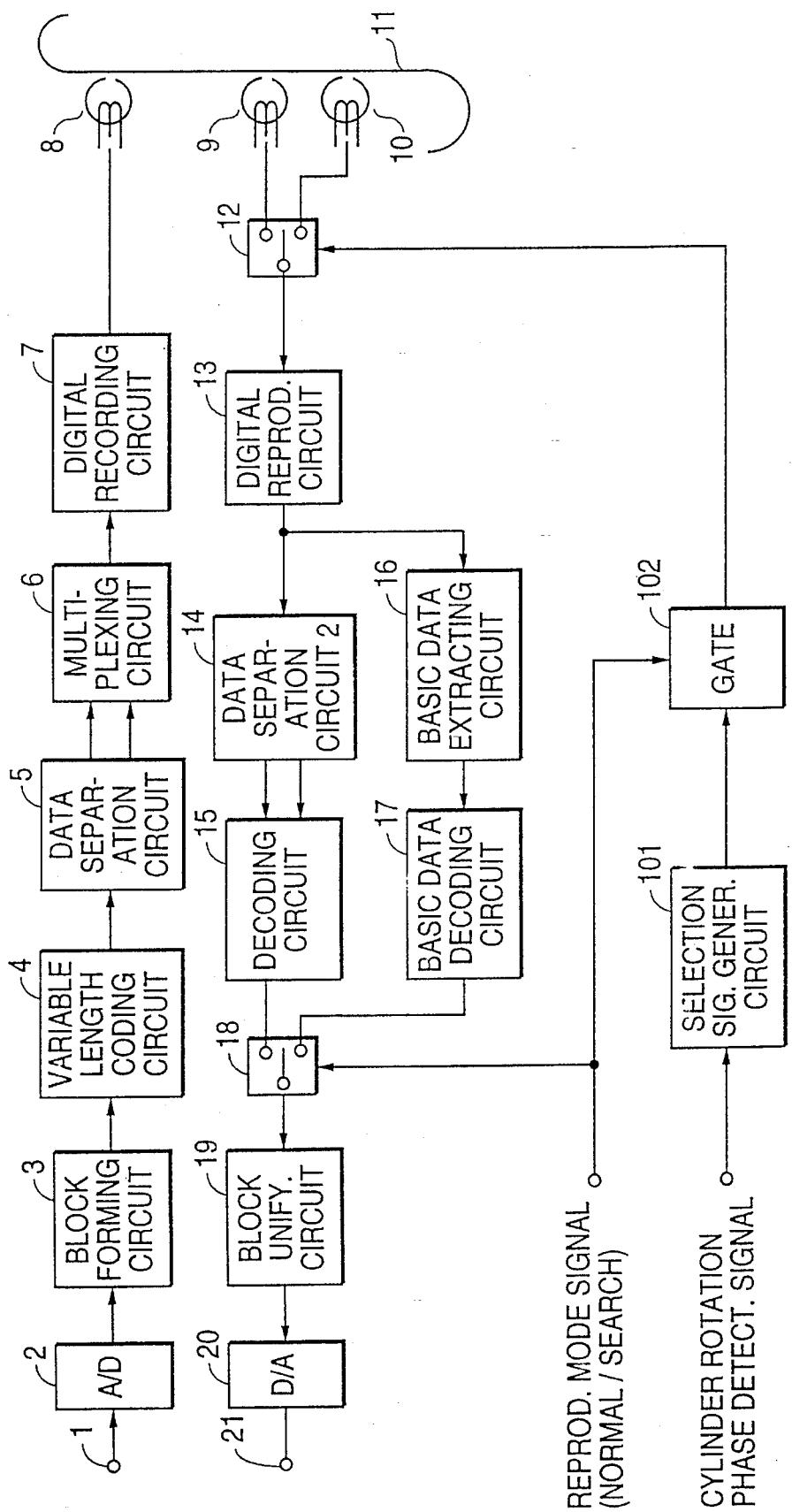
FIG. 1 is a signal processing block diagram of a recording/reproducing apparatus in accordance with an embodiment of the present invention.
Figure 2:
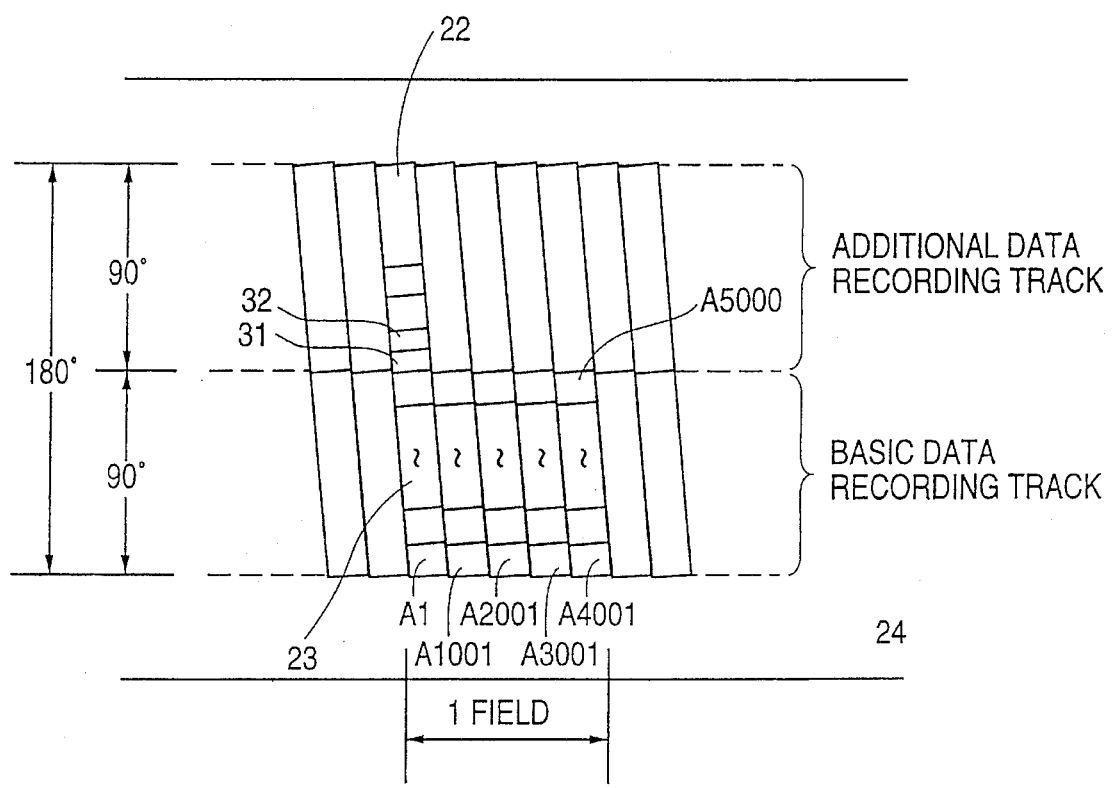
FIG. 2 is a recording track pattern diagram of said embodiment.
Figure 7:
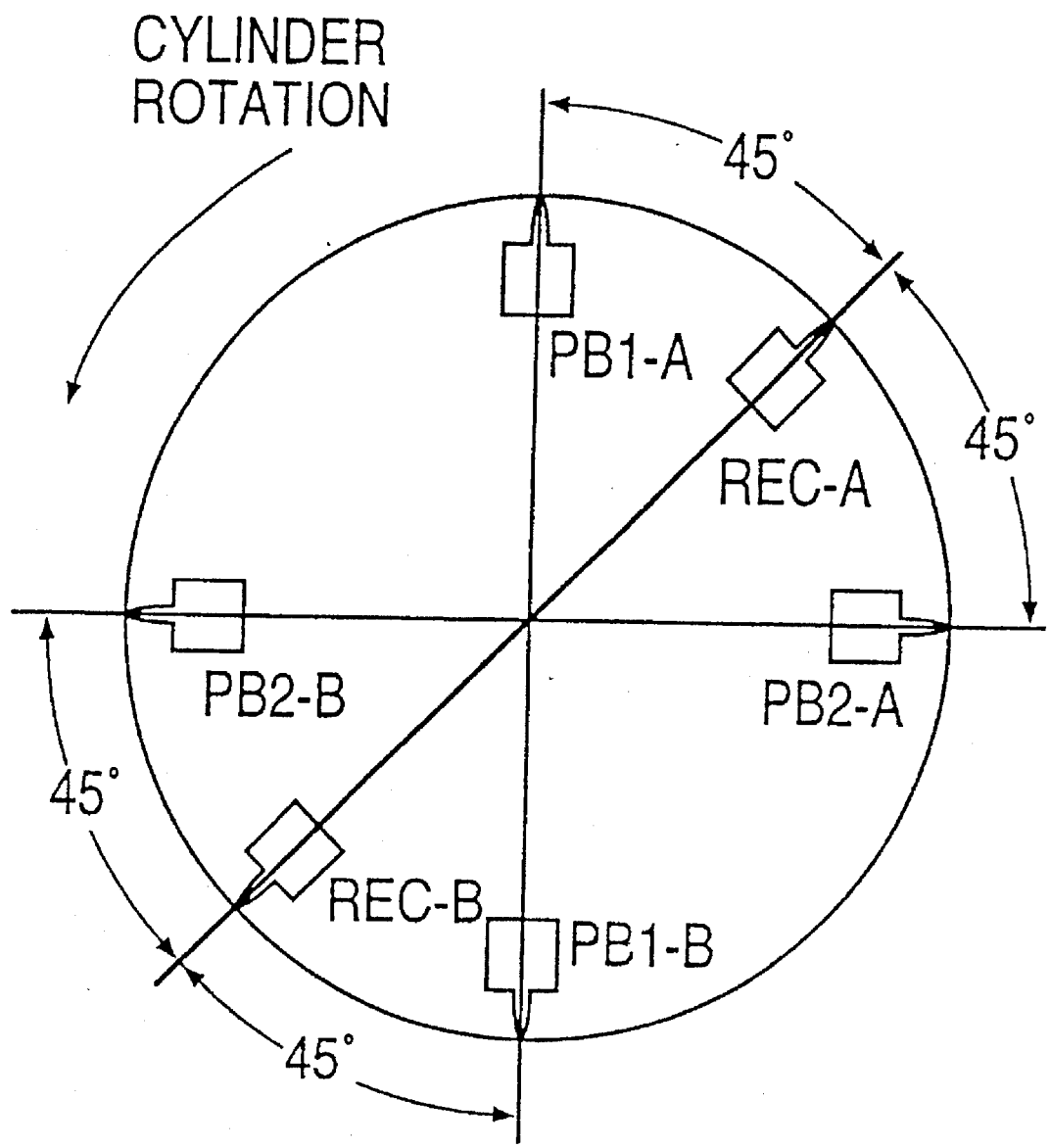
FIG. 7 is a head layout sketch showing the construction of the rotary cylinder.

FIG. 1 is a signal processing block diagram of a recording/reproducing apparatus in accordance with an embodiment of the present invention, and FIG. 2 is a recording track pattern diagram of this embodiment. In this embodiment, as shown in FIG. 7, the recording heads (REC-A, REC-B) are mounted at 180° opposite to each other on a rotary cylinder, and the reproducing heads are mounted in two channels at the angels of +45° (PB1-A, PB1-B) and −45° (PB2-A, PB2-B) with respect to the recording heads. An explanation follows for the case of, for example, rotating the rotary cylinder at a rotation speed of 5 times that of the frame frequency (i.e. one-field image is recorded on five tracks) to carry out recording. Also, for the simplification of the explanation, the video signal to be recorded is the luminance signal.

In FIG. 1, reference numeral 1 denotes an input terminal for inputting video signals; element 2 is an A/D converter for converting the video signal into video image data consisting of 8 bit digital signals; element 3 is a block forming circuit for splitting the video image data into coding blocks; element 4 is a variable length coding circuit for subjecting the video image data to bit rate reduction including variable length processing (hereinafter referred to as variable length coding); element 5 is a first data separation circuit for extracting and dividing basic data which shows a basic characteristic of the video image and has a fixed data length and additional data which shows detailed information and has a variable data length from the variable length coded data; element 6 is a multiplex circuit for time-domain multiplexing the basic data and additional data; element 7 is a digital recording processing circuit for carrying out error correction coding, additions of a synchronous signal and an ID (identification signal) and modulation which are performed during digital recording; element 8 is a recording head; element 9 is a first reproducing head; element 10 is a second reproducing head; element 11 is a recording medium; element 12 is a first switch for selecting the reproduction signal from either the first or second reproducing heads; element 13 is a digital reproducing circuit for carrying out reproduction and demodulation of the reproduced signal, detection of the synchronous signal and ID, and error correction; element 14 is a second data separation circuit for separating and outputting the basic data and the additional data which are time-domain multiplexed on the reproduced data; element 15 is a decoding circuit for decoding the decoding data from the basic data and the additional data; element 16 is a basic data extracting circuit for extracting the basic data from the reproduced data; element 17 is a basic data decoding circuit for decoding only the basic data; element 18 is a second switch for selecting between the output from the decoding circuit 15 and the output from the basic data decoding circuit 17; element 19 is a block unifying circuit for unifying the decoded data decoded on a block by block basis, rearranging the data into a data row of video signals to obtain the reproduced data; element 20 is a D/A converter for converting the reproduced data into analog video signals, and element 21 is an output terminal. The second switch 18 is controlled by a reproduction mode signal obtainable from a reproduction mode selection switch of a VCR (not illustrated), so as to output by selection the output of the decoding circuit 15 during a normal reproducing mode, and the output of the basic data decoding circuit 17 during a searching mode. The selection signal generating circuit 101 generates a selection signal which reverses at every 90° rotation of the cylinder from the well known cylinder rotation phase detection signal. The gate 102, being controlled by the reproducing mode signal, allows the selection signal to pass from the selection signal generating circuit 101 only during searching, so as to output the output signal of the first reproducing head 9 by selection during the normal reproduction of the first switch 12, and output the output signals of the first and the second reproducing heads 9 and 10 alternatively in response to the selection signal during searching. In FIG. 2, element 22 denotes a recording track for recording the additional data; element 23 is a recording track for recording the basic data, and element 24 is a recording medium.

Figure 6:
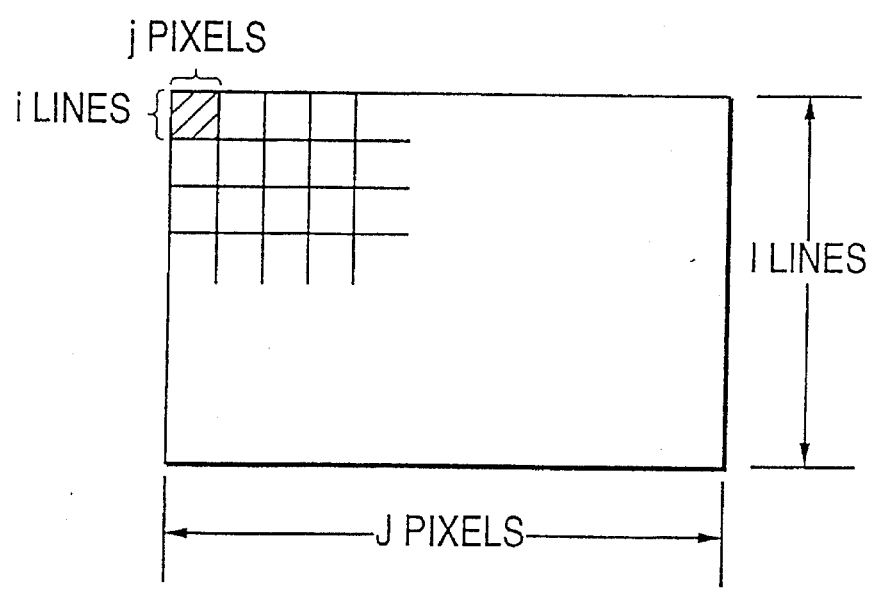
FIG. 6 is a conceptual view showing block formation of the coding block.

The operation of the recording/reproducing apparatus of this embodiment as constituted above is explained as follows. The video signal inputted from the input terminal 1 is converted to a digital video signal and inputted to the block forming circuit 3. In the block forming circuit 3, the video data is temporarily stored in a memory, a screen of 1 field is split into N blocks and read out from the memory, and the video data split into the coding blocks are outputted. FIG. 6 is a conceptual view showing this block formation. The screen of 1 field comprises I line * J picture elements, which are split into small coded blocks of i line * j picture elements. The number of coding blocks of the video data of 1 field, N, is given as N= (I/i) , (J/j). In this embodiment, for example, I= 800, J= 400, i= j= 8, N= 5000.

The block-formed video data is inputted to the variable length coding circuit 4 and subjected to variable length coding. The variable length coding is obtained by providing different coding lengths according to the information held by the video data in each coding block. The variable length coded data generally include the basic data An which shows the basic characteristics of the video image of the n-th coded block (n is an integer of $1 \leq n \leq N$) and the additional data Bn which shows the detailed information of the video image. Here, as an example of the variable length coding, an explanation follows on DCT (Discrete Cosine Transform) and dynamic rang coding. DCT, for example, carries out frequency conversion by the operation of the 8 * 8 data matrix obtained by dividing each 8 line * 8 picture elements and the 8 * 8 transform matrix, and code the sequency which is the result of this operation by a variable length code such as, for example, a Huffman code. In this case, the basic data An to the nth coding block is the data in which the sequency which shows the DC component is coded by the fixed data length, and the additional data Bn is one in which a sequency other than that is coded by Huffman coding. On the other hand, the dynamic range coding obtains a dynamic range of the video image data contained in the coding block divided, for example, by 8 lines * 8 picture elements on a screen, and quantizes each picture element within the dynamic range with a number of bits less than 8 bits. Accordingly, the basic data An to the coding block n is data which has a dynamic range and minimum value given by the fixed length data, and the additional data Bn is data which has been coded by a specified coding length according to the dynamic range on a picture element by picture element basis.

Figure 3:
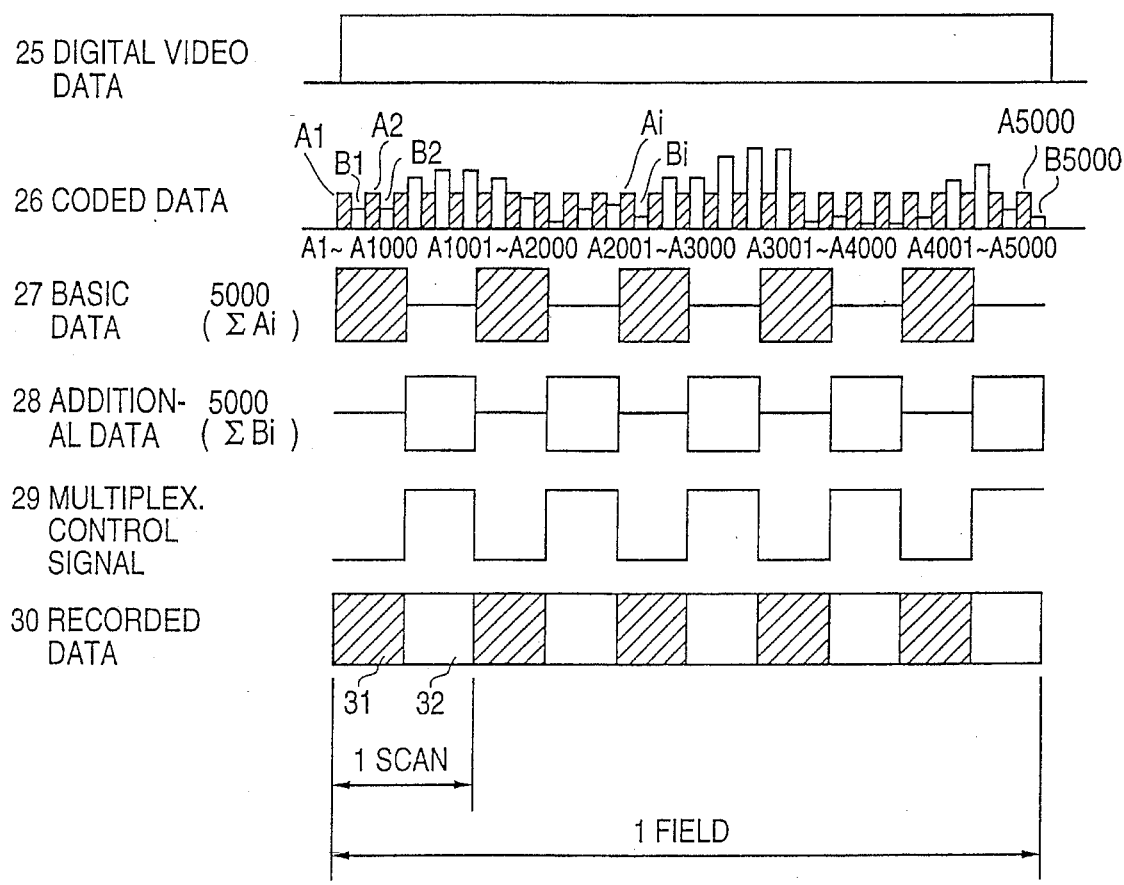
FIG. 3 is a timing chart showing the timing of the signal processing.

Timing line 26 in FIG. 3 shows the data which has been subjected to variable length coding in this method. The basic data of each coding block is given by the fixed length data of each coding block is given by the fixed length data, and the additional data Bn is given by the variable length data. In coding, processing is effected so that the coded data amount by the coding block may vary according to the characteristic held by the video data but the total as 1 field becomes a certain amount or therebelow. This variable length data 26 is inputted to the first data separation circuit 5, separated into the basic data An and the additional data Bn, and stored in the buffer memory by 1 field, respectively. From the data separation circuit 5, the basic data and the additional data, collected respectively, are outputted as shown in 27 and 28 in FIG. 3. Since the number of recording tracks of 1 field is 5 tracks, and the number of coding blocks N contained in 1 field is 5000, 1000 basic data units An are collected in an area 31 shown by the oblique lines and outputted. Also, to an area shown by 32, the additional data Bn are collected and outputted, but as the data amount by the coding block varies according to the amount of information held by the video data by each coding block, the output timing varies.

The basic data and additional data are controlled by a multiplexing control signal 29 in the multiplexing circuit 6 and multiplexed to the 1 channel recording data 30. The recording data 30 is subjected to error correction coding, the addition of a synchronous signal and ID and modulation processings which are carried out in inputting the data to the digital recording processing circuit 7 and digitally recording the data on the recording medium 11 through the recording head 8. The basic data 31 of the recording data 30 and additional data 32 in FIG. 3 are respectively recorded on the basic data recording track 23 on the recording medium and additional data recording track 22 in FIG. 2, respectively. The recording head 8 corresponds to the recording heads of REC-A and REC-B on the rotary cylinder as shown in FIG. 7. In this embodiment, the ration of the basic data to the additional data is set at 1:1.

Next, an explanation follows on the reproducing processing. During the normal reproduction, the signal is reproduced from the first reproducing head 9 and inputted to the digital reproducing processing circuit 13 through the first switch circuit 12. During the normal reproduction, the above-mentioned first switch circuit 12, being controlled by the output signal of the gate 102, always selects the first reproducing head 9. The reproduced signal is subjected to demodulation, the detection of the synchronous signal and ID, and error correction in the digital reproducing processing circuit 13 as mentioned above, and the resultant output is inputted to the second data separation circuit 14. In the second data separation circuit 14, the reproduced data is stored in a temporary memory, and the basic data and the additional data are separately outputted. In the decoding circuit 15, the decoding data is decoded in sequence by the coding block from the basic data and additional data, and the decoded data is outputted to the block unify circuit 19 through the second switch circuit 18. The second switch circuit, being controlled by the reproducing mode signal, always selects the output signal of the decoding circuit 15 during normal reproduction. The decoded data decoded by each coding block as above is re-lined to the data line of the video signal by the block unification circuit 19, after which is converted into an analog signal by the D/A converter 16 and outputted as a reproduced signal.

Figure 4:
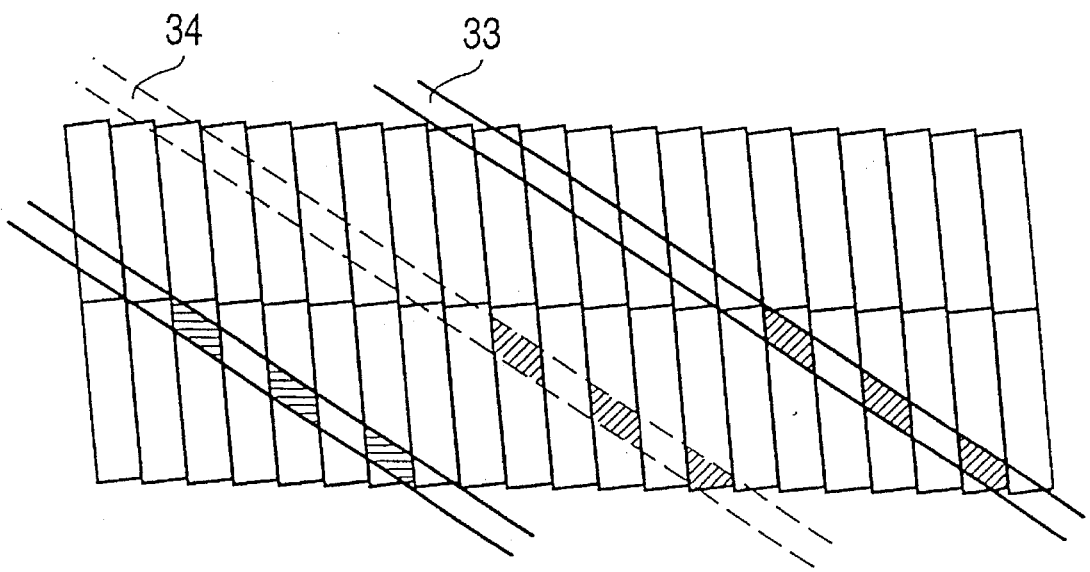
FIG. 4 is a head locus pattern diagram in which the reproducing a head traces on the recording medium during searching.
Figure 5:
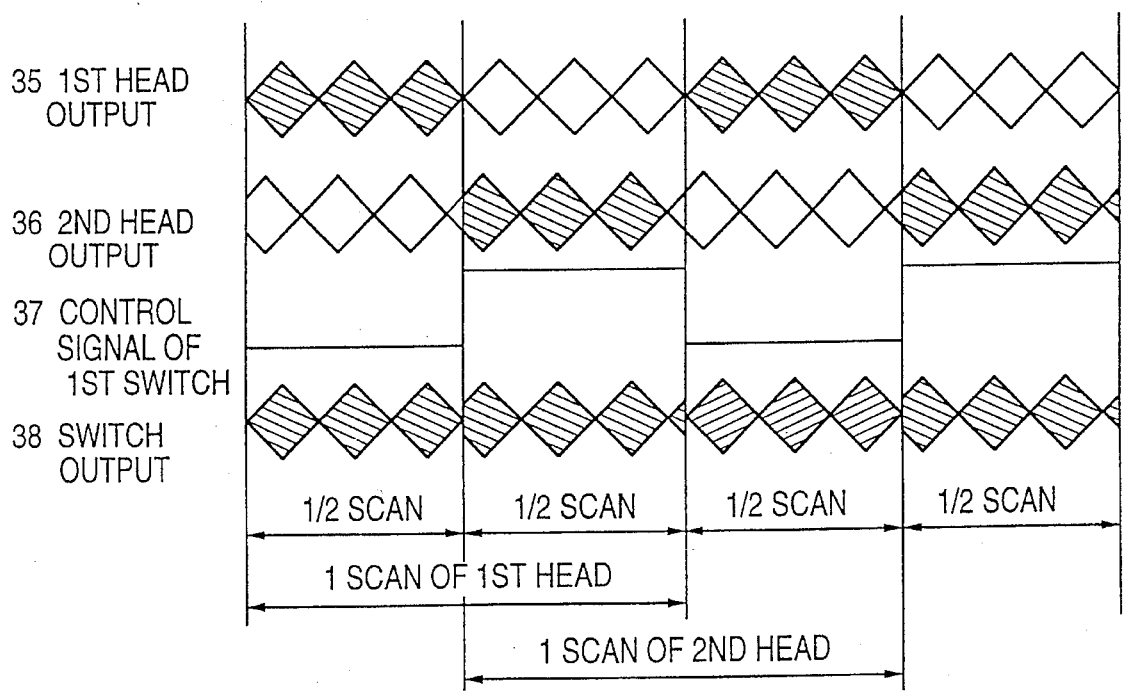
FIG. 5 is a waveform diagram showing the envelope of the reproduced signal during searching.

Next, an explanation follows on the reproducing processing during searching. In searching, the reproducing signals outputted from the first reproducing head 9 and the second reproducing head 10 are alternatively selected by the first switch 12 to carry out reproducing processing. FIG. 4 shows the head loci in which the first and the second reproducing heads 9 and 10 trace on the recording medium during searching, wherein reference number 33 denotes the head locus of the first reproducing head 9 and reference numeral 34 denotes the head locus of the second reproducing head 10. FIG. 5 shows envelope waveforms from the head of the respective reproduced signals and the signal waveform after switching. In FIG. 5 the shaded areas show the reproduced signals from the basic data recording track, which are reproduced by concentration within 90 degrees (i.e. within ½ scan) of the rotation angle of the rotary cylinder by each head. As the first reproducing head 9 and the second reproducing head 10 are disposed no the rotary cylinder at an angle of 90 degrees, the reproduced signals from the two heads may be selected at each 90 degrees of the rotation angle of the cylinder to provide a reproduced signal of 1 channel composed approximately solely of the basic data. Selection at each 90 degrees of the rotation angle of the cylinder is carried out in the first switch circuit 12. The control signal of the first switch circuit 12 is a selection signal produced by the selection signal generating circuit 101 from the rotation phase detecting signal of the rotary cylinder, being a selection signal outputted through the gate 102 which, being controlled by the reproducing mode signal, is opened only during searching.

The reproduced signal formed only of the above switched basic data is shown in the switch output signal 38 in FIG. 5. In the basic data extracting circuit 16, the additional data which has been mixed in the switch output signal 37 caused by disagreement of the selection timing of the first switch circuit 12 or the like is removed, and the basic data only is outputted to the basic data decoding circuit 17. In the basic data decoding circuit 17, if the bit rate reduction is a dynamic range coding, an average level is calculated block by block from the minimum value and the dynamic range and the mosaic form decoding data is decoded by each coding block. If a conversion coding such as DCT is used, a mosaic form decoding data is decoded from the DC component of the sequency. The decoded data is inputted to the block unification circuit 19 through the second switch circuit 18, and after rearrangement into the data of the video signal, it is converted into an analog signal by the D/A converted 20 and outputted to the output terminal 17. The second switch circuit 18 is controlled by the reproducing mode signal, and during searching it always selects the output signal of the basic data decoding circuit 17.

As described above, according to this embodiment, the video signal is subjected to variable length coding, and the basic data which shows the basic construction of the video image and the additional data which shows the detailed information of the video image are recorded in the regions separated by the rotation angle (90 degrees) of the rotary cylinder. Accordingly, it is possible to obtain a reproduced signal composed only of the basic data by selecting the two-channel reproducing heads mounted at 90 degree angle difference in searching. Therefore, with the signal processing line unchanged, the data acquisition rate of the basic data is doubly increased. However, it is desired to obtain the similar effect in recording in the ;nixed presence of the basic data and the additional data on a recording medium, a new reproducing processing circuit is required. Further, with respect to the basic data acquisition rate per scan, due to the recording of the basic data in the region within 90 degrees of the rotation angle of the rotary cylinder (i.e. within ½ of one track), the frequency for the reproducing head to cross the track during searching is equivalently divided in half, so that the rate of acquisition of the basic data per scan of the reproducing head is improved in comparison with the case of recording the basic data dispersed over the full length of the recording track. As the data renewal rate during searching is accelerated by the improvement of the data acquisition rates, the video images during searching follows the changes at a high speed even in the case of a quick movement or a change in scene, thereby providing search images which can be easily recognized.

This improvement: in the data acquisition rate can be attained even in the case of the bit rate reduction using a fixed length coding (with respect to the circuit constitution in this case, the variable length coding circuit 4 of FIG. 1 becomes a fixed length coding circuit to carry out coding at a fixed length), which is particularly effective when a variable length coding which shows good coding efficiency is employed. In other words, notwithstanding the variable length processing, the basic data having the fixed data length are recorded by collection, so that the error propagation characteristic with respect to the basic data, important in decoding, can be improved, and stabilized reproduced images can be obtained. Further, even in the data which has been subjected to variable length coding, the search images can be decoded only by the fixed length reproduced basic data in searching, so that the signal processing is simplified, and more stabilized search images can be obtained.

Although the images in searching become a mosaic screen, such an image style does not cause any great problem because the search images which can be sufficiently identified are obtainable because of the small coding blocks. Further, since a VCR for professional use is furnished with a preceding reproducing head and a simultaneous reproducing head, when the basic data during searching is reproduced, the data acquisition rate in searching can be improved without any special head.

In this embodiment, basic data extracting circuit 16 which is operated only during searching and a basic data decoding circuit 17 are provided for explanatory purposes. However, the same functions can b included in the second data separation circuit 14 and the decoding circuit 15, respectively.

Furthermore, although an explanation has been provided on the premise that the recording channel is 1 channel, it may be multi-channel recording which provides the same effect. In other word, generally in recording and reproducing video signals of P channels (P= 1, 2, 3, . . . ), P recording heads are provided on the rotary cylinder to record the coded data. Also, the rotary cylinder is provided with P first reproducing heads and Q (Q= 1, 2, 3, . . . ) second reproducing heads mounted at a specific angle with respect to the first reproducing head. During searching, the first reproducing heads and the second reproducing heads may be selected at a specified timing with a switch 12 to obtain the reproduced signals of P channels.

Whereas the ratio of the basic data to the additional data has been set to be 1:1, any other ratio may be adopted to give the similar effects. Further, in this embodiment, the data acquisition rate is doubly increased by processing by selecting two heads. However, it is possible to adopt such a construction as to make the tape winding angle during searching 90 degrees to lessen the burden of the mechanical system during searching. Needless to say, the present invention can be utilized not only for a VCR but also for other recording/reproducing apparatuses such as a video disk layer.

What is claimed is:

1. A video signal digital recording/reproducing apparatus comprising:

a block forming circuit, said circuit dividing an input video signal into a plurality of blocks each composed of a plurality of picture elements;

an encoder, said encoder subjecting each of said plurality of blocks to a bit rate reduction encoding processing including a variable length coding processing to obtain a plurality of blocks of coded data, each block of said plurality of blocks of coded data being composed of basic data which represents rough basis construction of an image of said block and which comprises data of a fixed data length and additional data which represents details of the image of said block and which comprises data of a variable data length;

a data separating circuit, said circuit extracting and separating, from said plurality of blocks of coded data, all of said basic data to obtain a collection of said basic data and for extracting and separating, from said plurality of blocks of coded data, all of said additional data to obtain a collection of said additional data; and a recorder, said recorder recording said collection of said basic data and said collection of said additional data on a recording medium such that an entire area of the recording medium is divided into a first continuous region in which only said collection of said basic data is continuously and collectively recorded and a second continuous region in which only said collection of said additional data is continuously and collectively recorded.

2. An apparatus as claimed in claim 1, further comprising a searching and reproducing circuit, said circuit searching and reproducing only the recorded basic data in a searching mode, and a decoder, said decoder decoding the reproduced basic data to reproduce a rough basic construction of a whole image.

3. A video signal digital recording/reproducing apparatus comprising:

- a block forming circuit, said circuit dividing an input video signal into a plurality of blocks each composed of a plurality of picture elements;
- an encoder, said encoder subjecting each of said plurality of blocks to a bit rate reduction encoding processing including a variable length coding processing to obtain a plurality of blocks of coded data, each block of said plurality of blocks of coded data being composed of basic data which represents rough basic construction of an image of said block and which comprises data of a fixed data length and additional data which represents details of the image of said block and which comprises data of a variable data length;
- a data separating circuit, said circuit extracting and separating, from said plurality of blocks of coded data, all of said basic data to obtain a collection of said basic data and for extracting and separating, from said plurality of blocks of coded data, all of said additional data to obtain a collection of said additional data; and
- a recorder, said recorder recording said collection of said basic data and said collection of said additional data on a recording tape wound on a rotary cylinder over a specific angle such that an entire area of the recording tape is divided into a first continuous region in which only said collection of said basic data is continuously and collectively recorded and a second continuous region in which only said collection of said additional data is continuously and collectively recorded, said recorder comprising a rotary head mounted on said rotary cylinder for scanning the recording tape to record said collection of said basic data and said collection of said additional data on the recording tape in the form of parallel tracks each being formed by one scan of the rotary head such that said collection of said basic data are recorded on a part of each track by a part of each scan and said collection of said additional data are recorded on the remaining part of each track by the remaining part of each scan.

4. A video signal digital recording/reproducing apparatus comprising:

- a block forming circuit, said circuit dividing an input video signal into a plurality of blocks each composed of a plurality of picture elements;
- an encoder, said encoder subjecting each of said plurality of blocks to a bit rate reduction encoding processing including a variable length coding processing to obtain a plurality of blocks of coded data, each block of said plurality of blocks of coded data being composed of basic data which represents rough basic construction of an image of said block and which comprises data of a fixed data length and additional data which represents details of the image of said block and which comprises data of a variable data length;
- a data separating circuit, said circuit extracting and separating, from said plurality of blocks of coded data, all of said basic data to obtain a collection of said basic data and for extracting and separating, from said plurality of blocks of coded data, all of said additional data to obtain a collection of said additional data; and
- a recorder, said recorder recording said collection of said basic data and said collection of said additional data on a recording tape wound on a rotary cylinder over a specific angle such that an entire area of the recording tape is divided into a first continuous region in which only said collection of said basic data is continuously and collectively recorded and a second continuous region in which only said collection of said additional data is continuously and collectively recorded, said recorder comprising a rotary head mounted on the rotary cylinder for scanning the recording tape to record said collection of said basic data and said collection of said additional data on the recording tape in the form of parallel tracks each being formed by one scan of the rotary head such that said collection of said basic data are recorded on a part of each track by a part of each scan and said collection of said additional data are recorded on the remaining part of each track by the remaining part of each scan;
- a reproducer, said reproducer being operative in a searching mode for searching and reproducing only the recorded basic data; and
- a decoder, said decoder decoding the reproduced basic data to reproduce a rough basic construction of a whole image.

* * * * *